United States Patent [19]

Voegele et al.

[11] Patent Number: 5,011,537

[45] Date of Patent: Apr. 30, 1991

[54] PRESSURE GAUGE CLEANING METHOD

[75] Inventors: Gerald G. Voegele, St. Bonifacius; William H. Penny, St. Anthony, both of Minn.

[73] Assignee: SciMed Life Systems, Inc., Maple Grove, Minn.

[21] Appl. No.: 266,528

[22] Filed: Nov. 3, 1988

[51] Int. Cl.$^5$ .............................................. B08B 9/04
[52] U.S. Cl. .............................. 134/22.11; 134/22.12
[58] Field of Search ................. 134/166 R, 18, 22.1, 134/22.11, 22.12, 22.14, 23, 24, 30, 136; 73/700; 15/315, 316, 320

[56] References Cited

U.S. PATENT DOCUMENTS 3,000,036  9/1961  Benedetti ........................ 15/316 R
3,208,460  9/1965  Heinicke ........................ 134/22.12

Primary Examiner—Anthony McFarlane
Attorney, Agent, or Firm—Kinney & Lange

[57] ABSTRACT

A method for cleaning the interior surface of a Bourdon Tube-type pressure gauge including the steps of inserting a guide tool in a bore of the gauge stem, aligning the guide tool with a port connecting the Bourdon Tube with the bore, inserting a flexible tube through the guide tool and the port and into the Bourdon Tube, and dispensing a fluid to flush the interior surface of the Bourdon Tube.

10 Claims, 2 Drawing Sheets

PRESSURE GAUGE CLEANING METHOD

BACKGROUND OF THE INVENTION

1. Field of the Invention

The present invention relates to cleaning of interior surfaces which are difficult to access. In particular, the present invention relates to a method for cleaning the interior surfaces of a Bourdon Tubetype pressure gauge.

2. Description of the Prior Art

Percutaneous transluminal coronary angioplasty (PTCA) is a procedure for the treatment of partial blockages in the coronary arteries. The most widely used form of percutanteous coronary angioplasty makes use of a dilation balloon catheter. The catheter is inserted into the patient's vascular system and guided, through the use of angiographic techniques, until the balloon at the distal end of the catheter is positioned within a stenosis. A radiographic contrast fluid is then fed under pressure through an inflation lumen of the catheter to the balloon, which causes the balloon to expand outward, thereby opening the stenosis.

During the expansion and contraction of the balloon, it is important for the operating physician to carefully control the pressure applied to the balloon through the radiographic contrast fluid. In a typical angioplasty apparatus, a pressure gauge, such as a Bourdon Tube-type pressure gauge, is attached to the radiographic contrast fluid pressure system. The pressure gauge is viewed by the operating physician and the pressure data thus obtained is used to adjust the radiographic contrast fluid pressure applied to the balloon.

Bourdon Tube-type pressure gauges are well known in this industry and provide adequate pressure information for a relatively low cost. Unfortunately, the interior of the Bourdon Tube of the gauge typically includes residues from manufacturing, particularly flux residues, which could contaminate the radiographic contrast fluid and thereby pose a danger to the patient.

In the past, the interior surface of the Bourdon Tube of a pressure gauge has typically been cleaned in the following manner. A small tube with a curved or angled orifice is inserted into the stem of the pressure gauge. The gauge and tube are then mounted in a rotable fixture and spun about the axis of the stem of the gauge at high angular velocities. This method relies upon centrifugal force to move wash fluid exiting the angled orifice into the Bourdon Tube of a gauge. Subsequently, the spinning is stopped, the gauge removed and a vacuum drawn to purge the wash fluid from the interior of the Bourdon Tube. An inert gas, such as nitrogen, is then used to fill the vacuum. The process is repeated three or four times.

The method of cleaning described above is expensive and time consuming, sometimes amounting to as much as four times the price of an uncleaned gauge. Further, the method is of doubtful effectiveness to actually clean the interior surfaces of the Bourdon Tube.

SUMMARY OF THE INVENTION

We have surprisingly discovered a method for cleaning the interior surface of a Bourdon Tube-type pressure gauge. The method includes the steps of inserting a guide tool into the bore of the stem of the gauge, aligning the guide tool with the port or access hole connecting the bore of the stem with the interior of the Bourdon Tube, inserting a flexible tubing through the guide tool and into the Bourdon Tube until the distal end of the flexible tubing is adjacent the distal end of the interior of the Bourdon Tube, and dispensing a fluid from the distal end of the flexible tube adjacent the distal end of the Bourdon Tube to flush the interior surfaces of the Bourdon Tube.

DETAILED DESCRIPTION OF THE PREFERRED EMBODIMENTS

Figure 1:
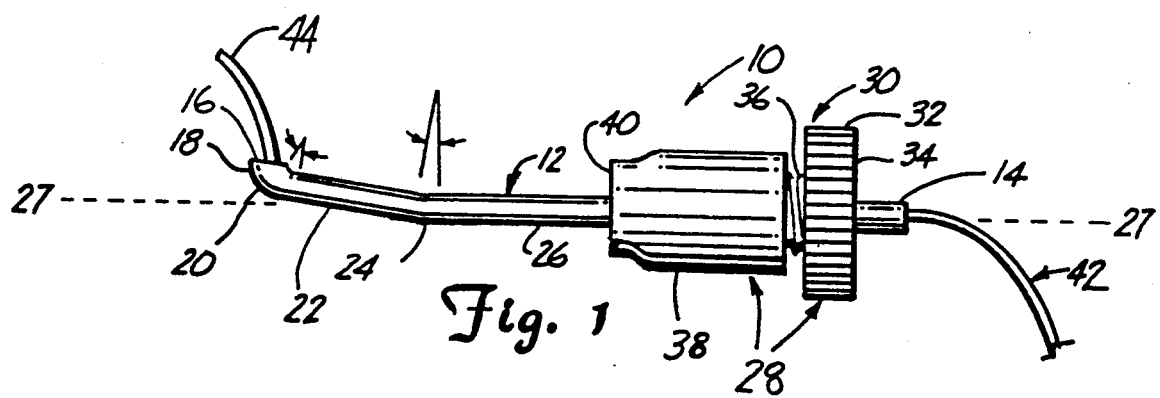
FIG. 1 is a side view of a guide tool of this invention with a section of flexible tubing extending through the lumen of the tool.

In FIG. 1, a guide tool of this invention is generally shown at 10. The tool 10 includes a hollow substantially rigid tube 12. The tube 12 has a proximal orifice 14 and a distal orifice 16. The tube 12 further includes a first leg 18 extending from the distal orifice 16 to a first bend 20, a second leg 22, extending from the first bend 20 to a second bend 24 and a third leg 26, extending from the second bend 24 to the proximal orifice 14. The third leg defines an axis 27. The first bend 20 has a radius of about 0.156 inches and turns through an angle of approximately 48 degrees. The second bend 24 has a radius of approximately 0.804 inches and turns through an angle of approximately 13 degrees. The first leg 18 has a length of approximately 0.030 inches. The second leg 22 has a length of about 0.200 inches.

A steering handle or knob 28 is coaxially carried on the third leg 26. The handle 28 includes a proximal portion 30 having a radially extending shoulder with a grooved surface 32, a proximal face 34 and a distally-extending threaded portion 36. The handle 28 also includes a distal cap portion 38 also coaxially carried upon the third leg 26. The distal cap portion 38 tightens onto the threaded portion 36 locking the handle 28 upon the third leg 26 of the tool 10. The distal cap portion 38 of the handle 28 has a distal-most extension surface 40. Cap 38 carries an o-ring seal 41 (see FIGS. 4 and 5) which provides a compression seal around tube 12 when cap 38 is threaded into position on threaded portion 36.

The distal orifice 16 is offset from the extension of the axis 27 defined by the third leg 26 by about 0.104 inches. The distance from the distal orifice 16 to the distal-most surface 40 of the handle 28 is at least 1.250 inches. The diameter of the proximal shoulder 32 of the handle 28 is approximately 0.50 inches. The handle 28 has a length of approximately 0.75 inches. The overall length of the tool is approximately 2 inches.

The hollow tube 12 is formed of stainless steel tubing having an outer diameter of approximately 0.050 inches and an inner diameter of approximately 0.044 inches. The handle 28 is formed primarily of polycarbonate material.

The stainless steel tubing 12 may be formed into the above-described shape by first inserting a wire having a diameter of about 0.040 inches. A most suitable wire is a guide wire including a covering layer which is a spring winding. After inserting the guide wire, the stainless steel tubing 12 is heated to a red hot temperature at the desired position for the first bend 20 by exposing to the flame of a small torch. The torch should be small so as to localize the bending area. Once the tube 12 is heated to red hot, the tube 12 with the inserted wire is bent to the appropriate radius and angle to form the first bend 20 as indicated above. The tube 12 is reheated to red hot at the desired location of the second bend 24. Next, the tube is cooled and the guide wire withdrawn. Withdrawal of the guide wire typically requires considerable force. The guide wire serves to prevent crimping or occluding of the lumen of the tubing during the formation of the bends 20 and 24. Next, the steering handle 28 is slipped onto the third leg 26 and tightened. Additionally, a urethane adhesive may be employed to further bond the handle 28 to the stainless steel tube 12.

Also in FIG. 1, a portion of a flexible tube 42 is shown inserted through the lumen of the tool 10. The flexible tube 42 includes a distal orifice 44 extending from the proximal orifice 16 of the tool 10. The opposite end of the tube 42 is connected to a pressure reservoir of a fluid, (liquid or gas) (not shown). By inserting or withdrawing the flexible tube 42 from the proximal orifice 14 of the tool 10, the distal end 44 of the flexible tube 42 may be extended or retracted from the distal orifice 16, the flexible tube 42 sliding within the lumen of the stainless steel tubing 12. Additionally, the tool 10 defines the angle of extension, relative to the axis 27 of the third leg 26, for the tubing 42 as it exits the distal orifice 16. The angle of extension is defined by the sum of the angles of the tubing 12. In the preferred embodiment, the angle of extension is about 61 degrees (i.e., 61°=48°+13°).

The preferred dimensions of the flexible tube are 0.028 inches outer diameter and 0.021 inches inner diameter. The flexible tube 42 is formed preferably of polyethylene, although TEFLON (PTFE Fluorocarbon) or other lubricious materials are also suitable. Although the flexible tubing 42 is described as flexible, it must be stiff enough to push through the tool 10 and extend into the interior of a Bourdon Tube located adjacent the distal orifice 16 of the tool 10. Additionally, the flexible tubing 42 should be resistant to various liquids to be dispensed through the flexible tubing 42 and additionally be strong enough to maintain integrity when fluids are delivered under pressure through the lumen of the flexible tubing 42.

Figure 2:
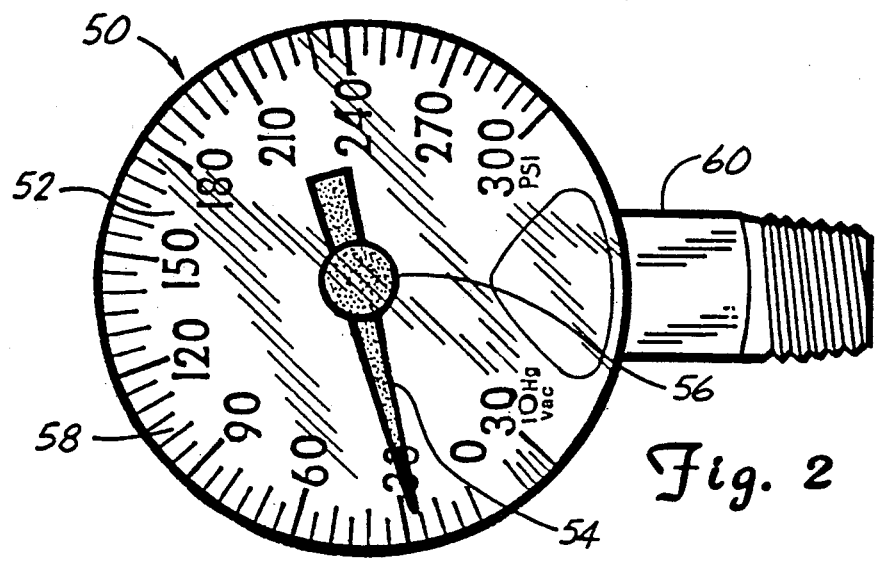
FIG. 2 is a front view of a Bourdon Tube pressure gauge.

In FIG. 2, a Bourdon Tube pressure gauge 50 is shown which includes a face plate 52, a needle 54 pivoting about a central hub or axis 56 and a plurality of pressure indicia 58 circumferentially located about the face plate 52 of the gauge 50. Additionally, the gauge 50 includes a stem 60.

Figure 3:
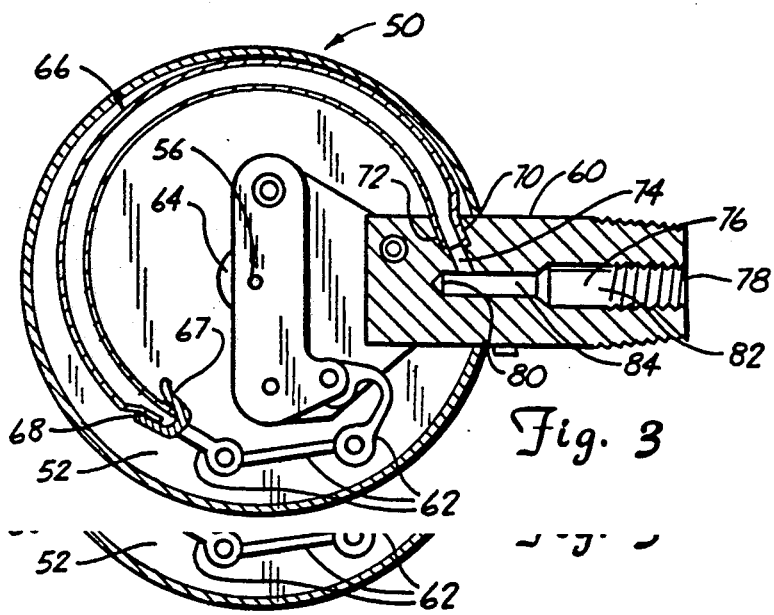
FIG. 3 is a sectional view from the back of a Bourdon Tube gauge.

In FIG. 3, a sectional view of the Bourdon Tube pressure gauge 50 is shown from the back. The gauge 50 again includes the stem 60 and the backside of the face plate 52. The hub or axis 56 upon which the needle 54 pivots is also visible and is shown connected to a mechanical linkage 62 which causes the needle 54 of FIG. 2 to pivot about the hub or axis 56. A spring 64 serves to return the needle to the zero position. A Bourdon Tube 66 has an arctuate shape with a distal end 68 attached to the mechanical linkage 62 The Bourdon Tube has an oval shaped cross section of about 0.25 inches by about 0.125 inches. Typically, the connection is a soldered connection 67 serving both as a seal for the distal end 68 of the Bourdon Tube 66 and as a solid connection to the linkage 62.

The opposite or proximal end 70 of the Bourdon Tube 66 is soldered into a slot 72 in the stem 60. A port 74, formed by drilling from slot 72, connects the interior of the Bourdon Tube 66 with a bore 76 coaxially located within the stem 60. The port 74 has a diameter of about 0.080 inches. The bore 76 includes a Proximal orifice 78 and a distal terminus 80. Typically, the bore 76 is comprised of a first, larger diameter (about 0.20 inches) proximal bore 82 and a smaller diameter (about 0.106 to about 0.108 inches) distal bore 84. The port 74 opens onto the smaller bore 84 adjacent the distal terminus 80.

Typically, a burr is present within the smaller bore 84 as a result of drilling of the port 74. The port 74 is drilled at an angle of about 61 degrees relative to the axis of the stem 60. Additionally, the larger bore 82 may be partially threaded. The terminus 80 and the transition from large bore 82 to small bore 84 are both frustoconical shapes.

Figure 4:
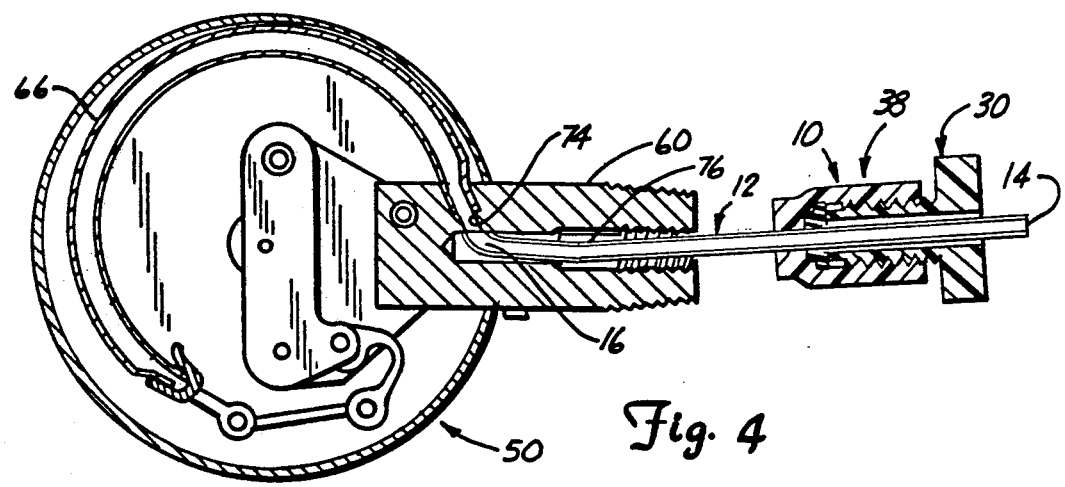
FIG. 4 is a sectional view of a Bourdon Tube gauge and a sectional view of a guide tool inserted in the guide position.

In FIG. 4, the back sectional view (as in FIG. 3) of the Bourdon Tube pressure gauge 50 is shown along with a sectional view of the guide tool 10, inserted within the bore 76 of the stem 60 with the distal end 16 of the tool 10 adjoining the port 74.

Figure 5:
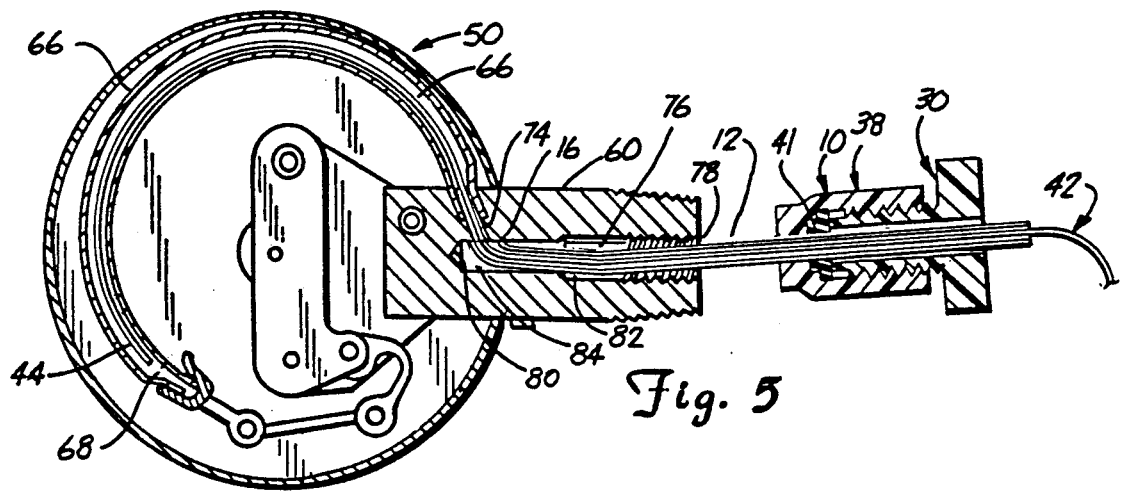
FIG. 5 is a sectional view of a Bourdon Tube gauge from the back with a guide tool inserted in the stem and a flexible tube inserted into the Bourdon Tube.

In FIG. 5, the Bourdon Tube pressure gauge 50 is again shown in section from a back view with the tool 10 inserted as in FIG. 4. Additionally, a flexible tubing 42 is shown inserted through the tool 10 and extending from the distal orifice 16 through the port 74, into the Bourdon Tube 66 with the distal end 44 of the flexible tubing 42 adjacent distal end 68 of the Bourdon Tube 66.

The interior of the Bourdon Tube may be cleaned as follows. First, the distal orifice 16 of the tool 10 is inserted past the port 74 and preferably to the distal end 80 of the stem bore 76. The distal orifice 16 should be rotationally oriented by rotation of the handle 28 such the distal orifice 16 is directed towards the port 74 side of the bore 76. Next, the tool 10 is withdrawn slightly from the distal end 80 of the stem bore 76, until it is aligned with the port 74.

In a most preferred embodiment of the method of the present invention, the flexible tubing 42 is inserted within the lumen of the tube 12 of the tool 10 with the distal end 44 of the tube 42 barely protuding from the distal orifice 16 of the tool 10. A slight insertion pressure is maintained on the tube 42, such that as the tool 10 is withdrawn, a slight yielding or advancing of the flexible tubing 42 occurs and is detected when a proper alignment of the distal orifice 16 and the port 74 is achieved. Additionally, the typical presence of the manufacturing burr surrounding the port 74, at the junction with the stem bore 76 may also be detected by a person performing the cleaning method.

Upon detecting the advance of the flexible tubing 42, indicating proper alignment of the distal orifice 16 with port 74, withdrawal of the tool 10 is terminated and further advance or extension of the tubing 42 is performed. The tubing 42 is advanced until the distal end 44 of the tubing is adjacent the distal end 68 of the Bourdon Tube 66. The adjacent position is maintained and fluid is dispensed through the flexible tubing 42. The fluid, exiting at the distal end 44 of tubing 42, flushes the interior surfaces of the Bourdon Tube 66 and eventually flows out at the proximal orifice 78 of the stem 60.

Optionally, advancement of the tube 42 may be indicated by the attachment of an indicia to the flexible tubing 42 at a position which indicates the proper amount of advance required to insert the distal end 44 to a position adjacent the distal end 68 of the Bourdon Tube 66.

Preferably, fluids injected through the flexible tubing 42 are chosen to efficiently clean and flush manufacturing residues from within the Bourdon Tube 66. In a most preferred method, 10 ml. of a liquid alkaline detergent, such as a 1:1 water dilution of C&H 320-L detergent (available from C&H Chemical Co., St. Paul, Minn.) is dispensed within the Bourdon Tube 66. Alternatively, Oakite 31 available from the Oakite Chemical Co. may be substituted for the preferred detergent solution. Next, 160 ml. of warm water, at approximately 50° C., is dispensed. Subsequently, approximately 80 ml. of warm isopropyl alcohol, at approximately 50° C. is dispended. Preferably, the gauge is held with the stem in an upward position during the liquid dispensing. Next, the gauge is preferably inverted, such that the stem 60 is in a downward position and a one minute air blast is dispensed through the tube 66.

After the air blast, the flexible tube and the tool are withdrawn as a unit. Preferably, the section of the tubing 42 which was extended into the Bourdon Tube 66 is cut off and discarded. Thereafter, a subsequent portion of tubing 42 with a new distal orifice 44 is inserted in subsequent gauges.

After cleaning, a Bourdon Tube gauge which was cleaned by the method of this invention was opened as a section as shown in FIG. 3. The interior surfaces of the Bourdon Tube were examined and found to be effectively cleaned by the method of the present invention. The present method is also relatively efficient since an experienced operator can wash (flushing with liquids) and dry (flushing with a gas such as air) a gauge approximately every two minutes using the preferred method of this invention. The method of this invention is especially appropriate for handling a limited number of gauges in a very efficient manner since a large capital investment is not required. Liquids or gases which are injected for cleaning purposes should be at approximately 45 psi. Other suitable liquids for flushing include non-polar solvents, such as Freon TF or TE, available from the E.I. DuPont Nemours Company of Wilmington, Delaware, which are effective in removing the non-polar components of the flux, for example Carbowax and charred components of flux. Additionally, polar solvents, such as water or alcohol are good for removing phosphoric acid and polypropylene glycol components of flux. Other useful fluids include various gases such as air.

With minor modifications of the tool dimensions, the present method may be used to clean back mount type gauges as well as many similar access problems. Generally, the tool of the present invention serves to turn or guide a flexible tube into a port or passage way which would be difficult to access with the flexible tube in the absence of the tool. The tool includes a substantially rigid tube including a combination of bends, which may be separated by legs, to provide a distal orifice which is capable of alignment with the port. The flexible tube is pushed through the rigid tube and into the port. Subsequently, fluid is dispensed through the flexible tube to clean or flush the port.

Although the present invention has been described with reference to preferred embodiments, workers skilled in the art will recognize that changes may be made in form and detail without departing from the spirit and scope of the invention.

What is claimed is:

1. A method for cleaning the interior surface of a pressure gauge, the gauge having a stem, a bore in the stem, and a pressure sensitive Bourdon Tube, closed at a distal end and connected at a proximal end at an angle to the bore at a port, the method comprising:
   inserting a guide tool in the bore of the stem;
   aligning the guide tool with the port;
   inserting a flexible tubing through the guide tool and into the Bourdon tubing and
   dispensing a fluid from the distal end of the flexible tube to flush the interior surfaces of the Bourdon Tube and the bore of the stem.

2. The method of claim 1 wherein the flexible tubing is inserted until the distal end of the flexible tubing is adjacent the distal end of the Bourdon Tube.

3. The method of claim 1 and further comprising removing the flexible tubing after dispensing the fluid from the distal end of the flexible tubing.

4. The method of claim 1 and further comprising removing the guide tool after dispensing the fluid from the distal end of the flexible tubing.

5. The method of claim 1 wherein the tool includes a rigid tube with a distal end portion bent to an angle matching the angle of the port, which connects the Bourdon Tube and the bore of the stem.

6. The method of claim 1 wherein the tool further includes a handle portion.

7. The method of claim 1 wherein the flexible tubing is a lubricious material.

8. The method of claim 1 wherein the fluid is a solvent.

9. The method of claim 1 and further comprising:
   dispensing through the flexible tubing a gaseous material capable of evaporating excess and remaining fluid within the Bourdon Tube.

10. A method for cleaning the interior surface of a pressure gauge, the gauge having a stem, a bore in the stem, and a pressure sensitive Bourdon Tube, closed at a distal end and connected at a proximal end to the bore at a port, the method comprising:
   inserting a flexible tubing into the Bourdon Tube;
   dispensing a fluid from the flexible tubing into the Bourdon Tube to flush the interior surfaces of the Bourdon Tube.

* * * * *